US010176472B1

(12) United States Patent
Peterson

(10) Patent No.: US 10,176,472 B1
(45) Date of Patent: Jan. 8, 2019

(54) SYSTEMS AND METHODS FOR TONE TO TOKEN TELECOMMUNICATIONS PLATFORM

(71) Applicant: VANTIV, LLC, Symmes Township, OH (US)

(72) Inventor: Brant Peterson, Denver, CO (US)

(73) Assignee: Worldpay, LLC, Symmes Township, OH (US)

(*) Notice: Subject to any disclaimer, the term of this patent is extended or adjusted under 35 U.S.C. 154(b) by 0 days.

(21) Appl. No.: 15/380,498

(22) Filed: Dec. 15, 2016

(51) Int. Cl.
*H04M 11/00* (2006.01)
*G06Q 20/30* (2012.01)
*H04M 7/12* (2006.01)
*G06Q 20/24* (2012.01)
*G06Q 20/34* (2012.01)
*G06Q 20/16* (2012.01)

(52) U.S. Cl.
CPC ........... *G06Q 20/305* (2013.01); *G06Q 20/16* (2013.01); *G06Q 20/24* (2013.01); *G06Q 20/34* (2013.01); *H04M 7/1295* (2013.01); *H04Q 2213/13405* (2013.01)

(58) Field of Classification Search
CPC ...... G06Q 20/305; G06Q 20/34; G06Q 20/24; G06Q 20/16; H04M 7/1295; H04Q 2213/13405
See application file for complete search history.

(56) References Cited

U.S. PATENT DOCUMENTS

| | | | | |
|---|---|---|---|---|
| 2011/0228919 | A1* | 9/2011 | Tew | H04M 3/38 379/93.12 |
| 2014/0143146 | A1* | 5/2014 | Passanha | G06Q 20/40 705/44 |
| 2014/0365372 | A1* | 12/2014 | Ross | H04L 63/0471 705/44 |
| 2016/0269391 | A1* | 9/2016 | Gaddam | H04L 63/0807 |
| 2017/0026516 | A1* | 1/2017 | Westlake | H04M 3/5183 |
| 2017/0103435 | A1* | 4/2017 | Saia | G06Q 30/0601 |
| 2017/0161516 | A1* | 6/2017 | Mondal | G06F 21/602 |
| 2017/0161741 | A1* | 6/2017 | Ross | G06Q 20/401 |
| 2017/0262842 | A1* | 9/2017 | Subbarayan | G06Q 20/385 |
| 2018/0005285 | A1* | 1/2018 | Narasimhan | G06Q 30/0605 |

* cited by examiner

*Primary Examiner* — Stella L. Woo
(74) *Attorney, Agent, or Firm* — Bookoff McAndrews, PLLC

(57) ABSTRACT

Methods and systems are disclosed for enabling the generation of a token corresponding to a tone generated by a telephony system, comprising receiving one or more dual tone multi-frequency (DTMF) tones generated by a telephony system, generating a token based on the one or more DTMF tones; and transmitting the generated token to a merchant system.

20 Claims, 5 Drawing Sheets

SYSTEMS AND METHODS FOR TONE TO TOKEN TELECOMMUNICATIONS PLATFORM

FIELD OF DISCLOSURE

The present disclosure relates generally to the field of secure network transactions and, more particularly, to the conversion of dual tone multi frequency (DTMF) tones to tokens for secure use of credit card data in a call center interactive voice response (IVR) setting.

BACKGROUND

Mail order/telephone order (MOTO) processing is increasingly ubiquitous, and merchants often accept payments over phones via a call center environment. Cardholder data is often received by a call center as a customer reads credit card data to a call center agent, or as a customer enters data through a keypad.

Such a process may be vulnerable to account data compromise, where the data may be used for fraudulent transactions. For example, call center agents could record, copy, or compromise cardholder data. Other security risks could be introduced by malware on desktop apps that can log keypad entry, for instance, as a call center agent enters received data. Further, as Voice over IP (VoIP) calls gain popularity, VoIP may become increasingly susceptible to security attacks. For example, tools exist for third parties to eavesdrop on VoIP calls. Threats to MOTO IVR operations may also take the form of information harvesting (e.g., algorithms that guess cardholder data), injection (e.g., fingerprinting, affecting, or crashing VoiceXML servers supporting IVRs through the input of spoken words), or crashing/affecting DTMF processing software in IVRs. Consequently, merchants are under pressure to be in Payment Card Industry Data Security Standard (PCI DSS) compliance, even as PCI compliance requirements increase in scope.

Meanwhile, security features are continually being developed. For example, "tokenization" is a means for replacing sensitive data with a "token" of data that may be non-decryptable or non-detokenizable by the merchant or other tokenization users (e.g., because they require third party decryption). Merchants, for example, might not ever store sensitive data themselves, thus enhancing data security.

Thus, a desire exists to remove cardholder data from call center environments, including call recording systems, agents, and desktop applications. In particular, DTMF tones may pose a security risk in that they align to a frequency standard, meaning, each tone corresponds to a specific and finite number that can be quickly reverse engineered back to clear text. Attackers can determine clear cardholder data simply via access to DTMF tones associated with the underlying cardholder data. Accordingly, a desire exists to remove DTMF data from call center environments. A desire may further exist to remove DTMF data from merchant Card Data Environments (CDE). A solution is needed that will secure DTMF tone input and provide secure transmission of cardholder data, while maintaining customer-agent interaction and expedience in a call center workflow.

SUMMARY

Included are embodiments of a computer-implemented method for tokenizing sensitive data. Some embodiments of a method comprise receiving one or more dual tone multi-frequency (DTMF) tones generated by a telephony system, generating a token based on the one or more DTMF tones; and transmitting the generated token to a merchant system.

Also included are embodiments of a system. Some embodiments of the system include a data storage device storing instructions for enabling generation of a token corresponding to a tone generated by a telephony system, and a processor configured to execute the instructions to perform a method comprising receiving one or more dual tone multi-frequency (DTMF) tones generated by a telephony system, generating a token based on the one or more DTMF tones; and transmitting the generated token to a merchant system.

Also included are embodiments of a computer-readable medium. Some embodiments of the computer-readable medium include a non-transitory computer-readable medium storing instructions that, when executed by a transaction processor, cause the transaction processor to perform a method for generation of a token corresponding to a tone generated by a telephony system, the method comprising receiving one or more dual tone multi-frequency (DTMF) tones generated by a telephony system, generating a token based on the one or more DTMF tones; and transmitting the generated token to a merchant system.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

The accompanying drawings, which are incorporated in and constitute a part of this specification, illustrate several embodiments and together with the description, serve to explain the principles of the disclosure.

DESCRIPTION OF THE EMBODIMENTS

Figure 1:
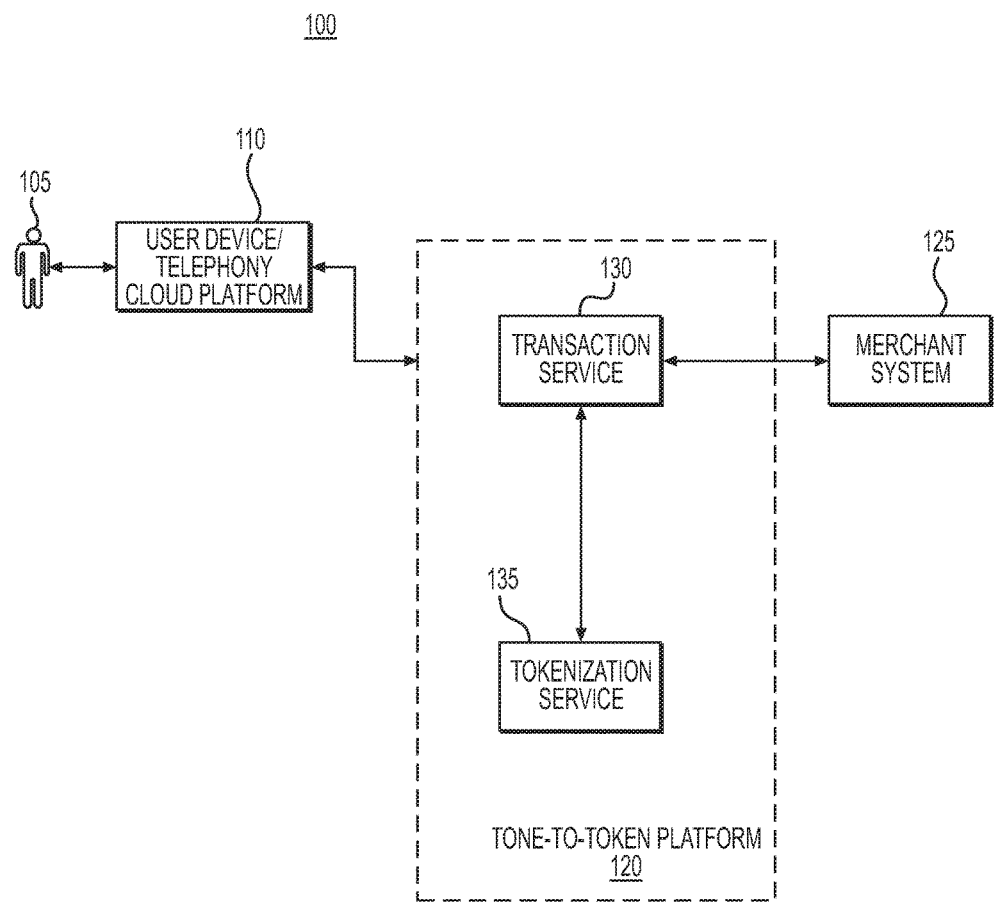
FIG. 1 is an example schematic block diagram of an environment and system for tokenization, according to techniques presented herein.

The present disclosed embodiments will now be described in detail with reference to several examples thereof as illustrated in the accompanying drawings. In the following description, numerous specific details are set forth in order to provide a thorough understanding of embodiments of the present disclosure. It will be apparent, however, to one skilled in the art, that embodiments may be practiced without some or all of these specific details. In other instances, well known process steps and/or structures have not been described in detail in order to not unnecessarily obscure the present embodiments. The features and advantages of embodiments may be better understood with reference to the drawings and discussions that follow.

The following discussion relates to methods and systems for generating a token corresponding to payment or card information received via DTMF tones. Exemplary payment information may include primary account numbers (PAN), card validation code/value (CVV/CVC), card expiration date, etc. Converting DTMF tones to non-sensitive tokens may increase security for electronic transactions conducted via call centers or interactive voice response (IVR) services.

In one embodiment, a user or customer may enter cardholder data via a number keypad on their personal device (e.g., on a phone). Traditionally, the merchant may have collected payment or card information by receiving DTMF signal(s) and determining a number corresponding to each received tone. Since security risks may exist if merchants have direct access to DTMF tones corresponding to secure data, the present systems and methods may include a platform that intercepts and converts DTMF signals to tokens. In one embodiment, the platform may be a hosted, third-party platform. The tokens may be transferred to a merchant system within their environment (e.g., a call center), meaning a transaction or payment may be completed without a merchant gaining access to DTMF signals or secure data.

It should be appreciated that particular consideration is made herein to credit card transactions due to the prevalence of these transactions. Despite this reference to credit cards, the disclosed systems and methods apply equally well to the transfer of any sensitive data, e.g., personal identification information (PII). Disclosed systems and methods may apply, for example, in online transactions in which a user is corresponding with a merchant via an online call service. Transactions may include debit transactions, gift card transactions, smart card transactions, mobile application transactions, and the usage of loyalty cards, to name a few. Systems and methods disclosed herein may be employed in effectively any circumstance in which sensitive data, such as a personal account number (PAN), social security number, etc., or token corresponding thereto, is being transmitted over a network. Further, while the party seeking to initiate a secure transaction may be referred to herein as a "merchant," a party seeking to initiate a secure transaction need not be a merchant, and may instead be a service provider, or any party seeking to execute a transaction.

The solution of capturing payment data before the data enters a merchant environment may provide risk reduction/PCI scope reduction, while maintaining existing business operations. For example, call center operations prioritize expedience and ease of use. Providing data security by tokenizing data before the data enters a merchant environment may improve security without disrupting the customer experience, adding additional time, disrupting current call center procedures, or introducing difficulty to a call center workflow.

FIG. 1 depicts an environment 100 in which a user 105 employs a user device and/or third-party hosted telephony cloud platform 110 to transact with a merchant system 125, by way of a tone-to-token platform 120. FIG. 1 also depicts an exemplary tone-to-token platform 120 comprising a transaction service 130 and a tokenization service 135. In one embodiment, tone-to-token platform 120 may intercept data (e.g., cardholder data) between the user device/telephony cloud platform 110 and merchant system 125. Tone-to-token platform 120 may tokenize cardholder data prior to the data reaching the merchant system 125. The transfer of data between components of environment 100 may be performed over a telecommunications network, for example, a carrier network, the Internet, any other type of network, or a combination thereof.

In one embodiment, the user device/telephony cloud platform 110 may include any telephony system. A user 105 may interact with a user device/telephony cloud platform 110 by voice or by entering numbers via a keypad. Exemplary user devices may include any telephone, mobile device, voice over IP (VoIP) system, etc.). A telephony cloud platform may include a communication service platform that can control, manage, capture, and analyze mobile communications. In particular, a telephony cloud platform may capture high risk cardholder data so that cardholder data is not exposed to merchant system 125. In this way, a telephony cloud platform may facilitate merchant PCI DSS compliance. In one embodiment, the user device/telephony cloud platform 110 may receive the tones (e.g., DTMF) for each of the numbers entered by the user 105. In one embodiment, the user device/telephony cloud platform 110 may further translate or process DTMF tones. In a further embodiment, user device/telephony cloud platform 110 may include a payment application for authorizing and completing payments with tokens in lieu of clear cardholder data.

In the course of the disclosure, "user" may refer to a customer (e.g., an individual or an entity submitting his/her card information). Other individuals interacting in the environment 100 may be referred to as "call center agents" or "agents."

Merchant system 125 may include any system that stores, processes, or transmits payment card information, e.g., the CDE. In other words, merchant system 125 may include any type of entities concerned with Payment Card Industry Data Security Standard (PCI DSS)-compliance, since any system in a CDE that touches cardholder data may be in scope for PCI DSS. For example, merchant system 125 may entail one or more merchant contact centers, including call centers, call center agents, call center infrastructure, call recording systems, desktop applications, etc. Merchant system 125 may include an automatic call distributor (ACD) and/or a private branch exchange. Merchant system 125 may use interactive voice response (IVR), where user 105 may be prompted to respond to commands from merchant system 125 in the form of voice and keypad (e.g., DTMF) input. Merchant system 125 may further include a customer relations management module or payment application. In one embodiment, merchant system 125 may receive data (e.g., voice input or DTMF tone input) through an automatic call distributor/private branch exchange and/or a call center agent interaction with a user. If the data is determined to be non-sensitive, the data may be transferred to a customer relations management module or payment application.

If the data is sensitive, the customer relations management module may prompt DTMF suppression at the automatic call distributor/private branch exchange. DTMF suppression may include halting recording of DTMF tones, preventing an agent from hearing DTMF tones, or any method of keeping DTMF tone user input from merchant system 125.

DTMF suppression may either be prompted by a call center agent, or automatically triggered. For example, a call center agent may prompt DTMF tone suppression after prompting a user to enter payment information info a keypad. The tone suppression may be performed by any component of environment 100. Automatic DTMF tone suppression may also occur a number of ways. For example, automatic DTMF tone suppression may occur upon detection that a user has been prompted to enter payment information, e.g., at a step in a workflow, text recognition, voice recognition, etc. In another example, automatic DTMF tone suppression may occur according to a preset criteria, e.g., a criteria based on entry of DTMF tones. For instance, a typical credit card number may be sixteen digits. A criterion for triggering DTMF tone suppression may include initiating DTMF tone suppression after receiving six consecutive DTMF tones.

In one embodiment, received DTMF tones may correlate to a display viewable by a call center agent. For example, a customer relations management module/payment application of merchant system 125 may provide a display to a call center agent, in which digits corresponding to DTMF tones are masked or truncated. In this way, the call center agent can remain in communication with a user and follow the user's data entry, while not being exposed to potentially secure data. In one embodiment, the display may be comprised of a web form hosted by the tone-to-token platform 120. In one embodiment, the web for may appear to the agent to be owned by the merchant while the form is actually hosted or controlled by tone-to-token platform 120 via, for example, an iFrame.

Overall, merchant system 125 may comprise cardholder data environment, in which card data may be used, for example, to process payments. Environment 100 may include the function of converting cardholder data to a token, where merchant system 125 processes payments or transactions using the token, rather than cardholder data itself.

In particular, tone-to-token platform 120 may serve as an intermediary between a user device/telephony cloud platform 110 and merchant system 125. In one embodiment, the tone-to-token platform 120 may tokenize cardholder data and provide the token to the merchant system 125. The token may be, for example, a randomly generated number, a pseudorandom number, encrypted information (e.g., in alignment of payment card industry (PCI) cryptography standards), a character sequence, etc. In other words, tone-to-token platform 120 may securely provide sensitive data to the merchant system 125, without the data being exposed to recording systems, agents, call center environments, or remote agents. In this way, tone-to-token platform 120 may prevent the threat of data theft before data is sent to a (merchant) acquiring processor. In one embodiment, tone-to-token platform 120 may include an application program interface (API) installed on user device/telephony cloud platform 110. In one embodiment, at no time may the merchant CDE have access to cardholder data.

Exemplary tone-to-token platform 120 may include transaction service 130 and tokenization service 135. In one embodiment, transaction service 130 may include a plurality of systems for receiving data, dependent upon transmission mechanism and data type. The transaction service 130 may determine the initiation of cardholder information transmittal and prompt or verify actions from the merchant system 125. For example, transaction service 130 may prompt suppression of recordings at merchant system 125 and/or initiate masking or truncating of displays of sensitive data or sensitive sub-data elements at merchant system 125. For example, a merchant system display may mask the middle six digits of a PAN. Alternately, transaction service 130 may receive confirmation from merchant system 125 that recording suppression and/or display masking/truncating has been initiated. Recording suppression may ensure that DTMF tones are not accessed by merchant system 125 (e.g., call center environments or agents at call centers). At the same time, an agent may remain in contact with a customer and hear a customer speaking, without hearing DTMF tones. In one case, a call center agent may trigger "DTMF tone suppression" when he/she is ready to capture payment information and request a user to enter payment information into a telephone keypad. In another case, transaction service 130 may prompt DTMF tone suppression, e.g., in response to a detection of user interaction with a keypad or a certain number of strokes entered through a keypad. For instance, transaction service 130 may automatically trigger DTMF tone suppression after detecting a series of six keystrokes on a user device keypad.

In one embodiment, transaction service 130 may further control a display corresponding to IVR correspondence (e.g., DTMF tone input). As previously discussed, masking or truncating displays may refer to informing a call center agent that cardholder data is being entered, without exposing the data to the call center agent. For example, each keypad stroke may correspond to a symbol (e.g., *) being displayed to the call center agent to mask an actual character. This means that a call center agent may interact with a user and see the user's progress in entering information, without being able to see the user's card information. Truncating displays may mean that a call center agent may see a portion, but not all, of the card information. For example, a display may include the last four digits of a credit card number or an expiration date of the card, but not display the entire credit card number. This way, the agent may have enough information to verify a user's card number, but not enough information to fully access the user's cardholder data.

In one embodiment, tokenization service 135 may receive cardholder data from user device/telephony cloud platform 110 and generate a token. The token may include a PAN, an expiration date for the token, an expiration date for the card, etc. Tokens might also not contain any sensitive data, but correspond to sensitive identification data, e.g., social security numbers, account information, cardholder data, or other sensitive financial data. Such sensitive data may be stored securely at the tone-to-token platform 120 or elsewhere.

In one embodiment, cardholder data may be encrypted. Encryption may occur at the user device/telephony cloud platform 110 or at the tone-to-token platform 120. In one embodiment, encryption may be in alignment with strong cryptography best practices and standards. Encryption may occur prior to data reaching the merchant CDE. DTMF tones, numbers corresponding to DTMF tones, or tokens based on DTMF tones may be encrypted. In receiving a token, merchant system 125 may complete a transaction using credit card data or other sensitive data, without possessing the actual credit card data or other sensitive data.

In one embodiment, tone-to-token platform 120 may further ensure the validity of a request. In one embodiment, tone-to-token platform 120 may securely return a transaction response to merchant system 125, along with the token generated by the tone-to-token platform 120.

In one embodiment, merchant system 125 may use a high-value token for subsequent transactions, rather than sending or accessing credit card information or other sensitive data for the subsequent transactions. Such a high-value token may represent PAN. For example, a restaurant may initially run a transaction for the cost of a meal, and perform a follow-up transaction using the token for processing the tip. Alternatively, a merchant may run multiple transactions for a recurring web subscription using one or more tokens. Another example may include recurring transactions for a gym membership or utility bill. A merchant may use tokens for returns or price adjustments rather than resending sensitive transaction information over a network.

Using tokenization, a merchant or retailer may enhance security by not storing sensitive data of customers on its own systems. In one embodiment, tokens may be stored by any components of environment 100, while sensitive data may be stored exclusively within the tone-to-token platform 120.

Figure 2:
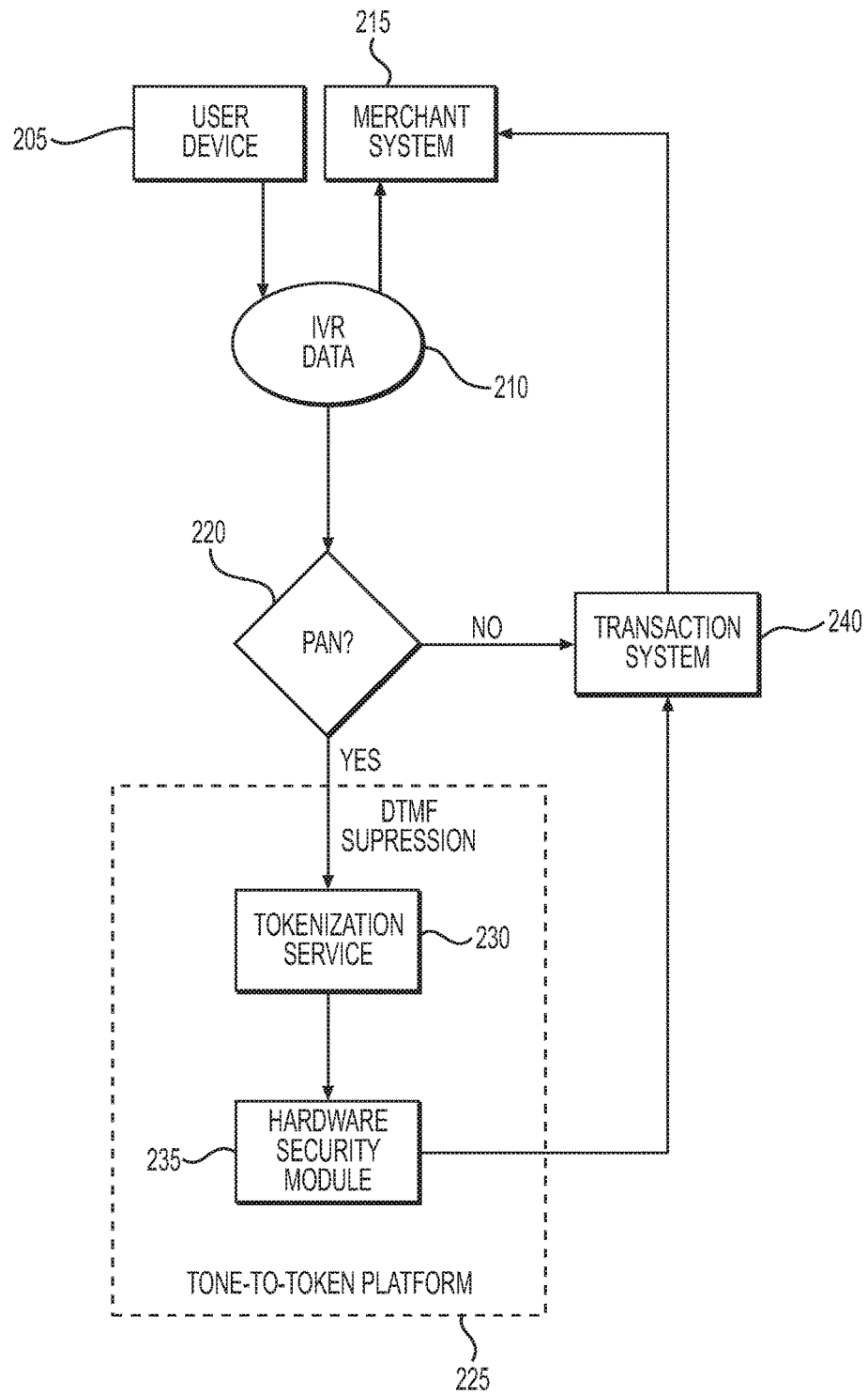
FIG. 2 is an example schematic block diagram of components within the tokenization system and a tone-to-token processor, in accordance with some embodiments.

FIG. 2 is an example schematic block diagram of components within the tokenization system and tone-to-token processor, in accordance with some embodiments. In this example block diagram, interactive voice response (IVR) may be the medium of interaction between a user device 205 and a merchant system 215. For example, an agent or call system at merchant system 215 may prompt a user to respond to requests for information, either by voice or by DTMF tones input via a user device 205 keypad. IVR data 210 may be comprised of the user's responses, for instance, in the form of a voice response or a DTMF tone input. IVR data 210 containing cardholder data may be treated differently from IVR data 210 that does not contain cardholder data (e.g., step 220). For example, if the IVR data 210 comprises cardholder data, the data may be transferred to a tone-to-token processor 225 via, for example, a dial-up access connector or Internet data connection, through which data may pass (e.g., via a network socket and/or web service). Any type of data connection may be established for data transfer purposes. In one embodiment, IVR data 210 may undergo DTMF suppression if it contains cardholder data.

In one embodiment, the tone-to-token processor 225 may tokenize received IVR data 210 using tokenization service 230. Analogously to tokenization service 135, tokenization service 230 may generate a token from the IVR data 210, where the IVR data 210 may include a PAN, an expiration date for the token, and/or an expiration date for the card.

In one embodiment, tokens generated by tokenization service 230 may be transferred to a transaction system 240, e.g., a system that may process payments. The transaction system 240 may interact with, or be part of, user device 205 or merchant system 215. In one embodiment, sensitive IVR data may be properly and securely handled either using a connection encryption or via a public encryption key that may only be decrypted by a third party, hosted platform. IVR data 210 that does not contain cardholder data may be transferred directly to merchant system 215 or to transaction system 240, which may be in communication with merchant system 215.

Figure 3:
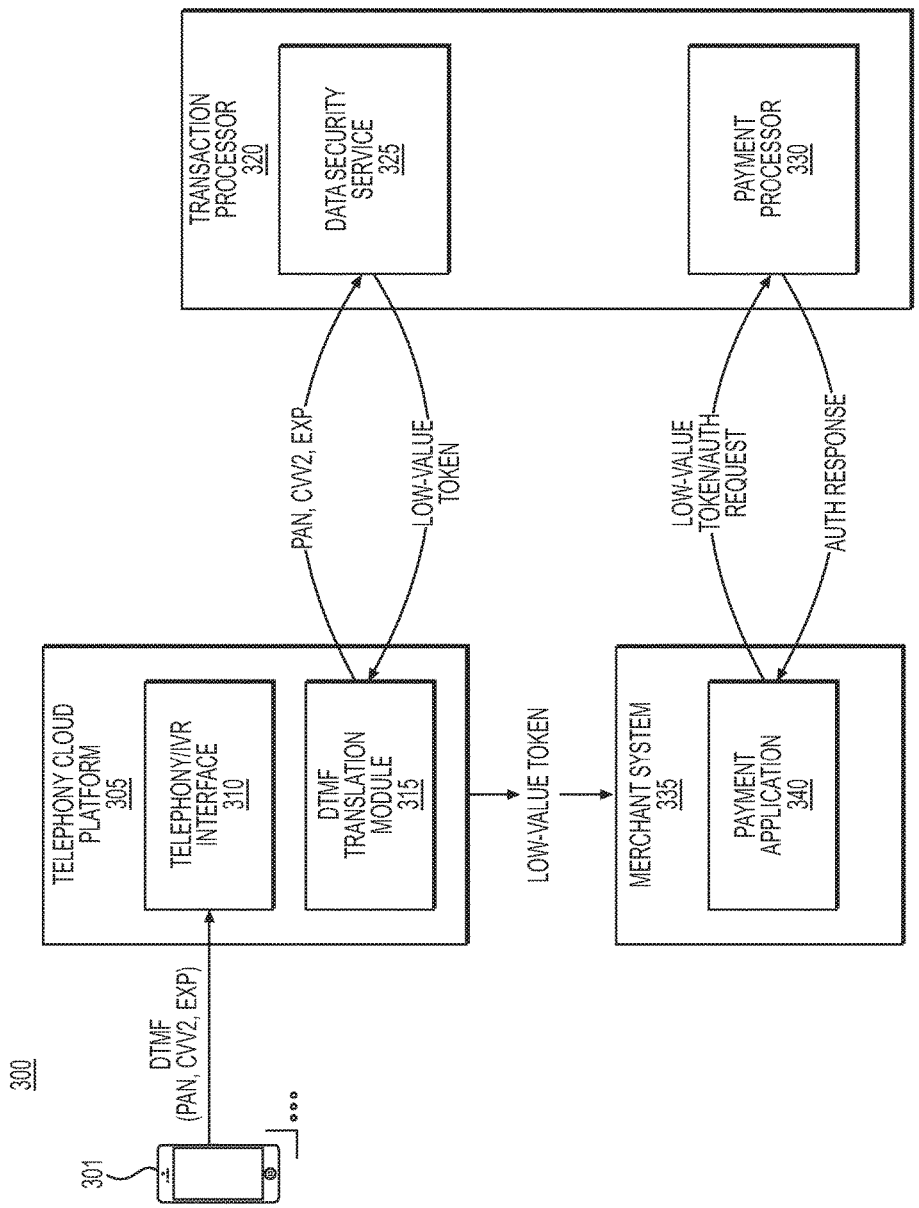
FIG. 3 is a block diagram illustrating a system 300 providing merchant authorization in a MOTO purchase scenario, in accordance with some embodiments.

FIG. 3 is a block diagram illustrating a system 300 providing merchant authorization in a MOTO purchase scenario, according to one embodiment. For example, in system 300, DTMF tones may be tokenized before reaching a merchant system. In one embodiment, user device 301 may interface with telephony cloud platform 305, comprising a telephony/IVR interface 310 and a DTMF translation module 315. In one embodiment, the transaction processor 320 may receive sensitive data from the telephony cloud platform 305 (e.g., the DTMF translation module 315). Exemplary sensitive data may include a personal account number (PAN), a card verification value (CVV), and/or an expiration date of a credit card, for example, in order to execute an online purchase. The transaction processor 320 may include a data security service 325 and a payment processor 330. In one embodiment, the data security service 325 may tokenize and/or encrypt the PAN received from the telephony cloud platform 305. In one embodiment, the data security service 325 may provide a token (e.g., a low-value token) to the telephony cloud platform 305. The low-value token may be a randomly generated, non-sensitive, registration identifier that acts as a replacement for the PAN and/or other sensitive data.

A low-value token may be generated dynamically, and may have a unique value for each transaction, even if the same PAN is presented for tokenization multiple times. Low-value tokens may utilize additional compensating controls such that the token applies only to specific transactions and processing environments. A transaction-based token value may be requested through a low-trust environment over the Internet. This type of process may add security benefits to the merchant, for example, allowing the merchant to avoid man-in-the-middle attack (MiM attacks) over the Internet. For instance, one embodiment may include no authentication for registering a low-value token. Authentication of the low-value token with the merchant may be recognized via a trusted environment. For such an embodiment, the merchant may use a trusted application interfacing with a payment processing platform to authenticate a low-value token. The token value might only be valid for 24-hours, or some other pre-determined period of time, after which it can no longer be used for payment processing.

In one embodiment, the telephony cloud platform 305 may transfer the low-value token to the merchant system 335, for example, to perform authorization or to convert to a high-value token (e.g., via a no-financial request to be authorized at a later date). For instance, the merchant system 335 may include a payment application 340 for authorizing and completing payment transactions. The payment application 340 may submit an authorization request to the payment processor 330 of the transaction processor 320. The payment processor 330 of transaction processor 320 may return an authorization response to the merchant system 335's payment application 340. In one embodiment, the payment processor 330 may further provide a high-value token to be stored for use at a later date. For example, once a low-value token is obtained by the merchant system 335, payment application 340 may contact payment processor 330 with the low-value token and an authorization request. Data security service 325 may convert the received low-value token to a high-value token, and the high-value token may be returned to the payment application 340 by the payment processor 330. In one embodiment, the merchant system 335/payment application 340 may receive authentication and interact with payment processor 330, but the merchant system 335/payment application 340 cannot interact directly with data security service 325. Such a structure may ensure that the merchant system 335/payment application 340 cannot access cardholder data. The merchant system 335/payment application 340 functionalities may be completed with tokens, rather than actual cardholder data.

In one embodiment, the high-value token may be stored by payment processor 330 or merchant system 335. The high-value token may be reused by the merchant for subsequent transactions. While data security service 325 and payment processor 330 are depicted as sending and receiving data, any entity in the transaction processor 320 may interact with the telephony cloud platform 305 and/or merchant system 335.

Figure 4:
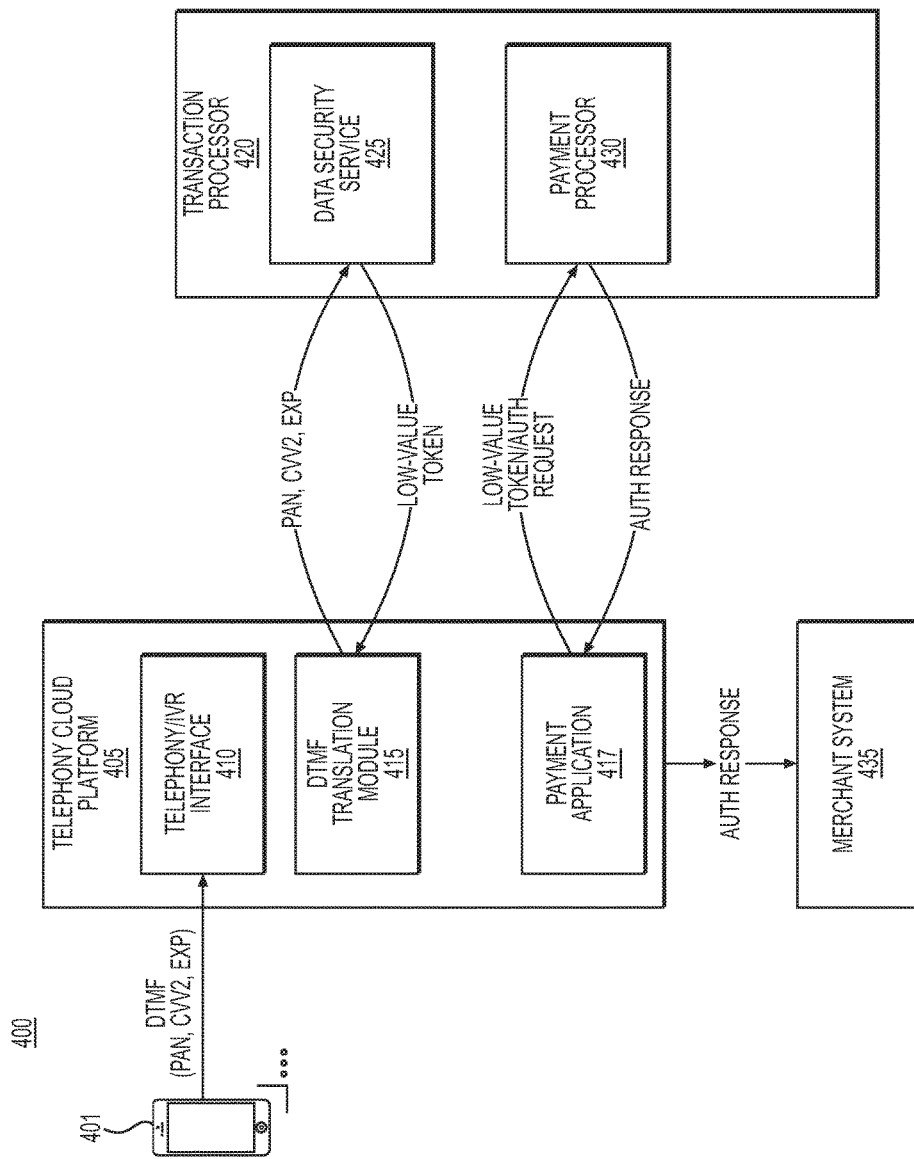
FIG. 4 is a block diagram illustrating a system 400 providing user device authorization in a purchase scenario, in accordance with some embodiments.

FIG. 4 is a block diagram illustrating a system 400 providing user device authorization in a purchase scenario, according to one embodiment. In system 400, DTMF tones may be tokenized before reaching a merchant system. In one embodiment, user device 401 may interface with telephony cloud platform 405, comprising a telephony/IVR interface 410, a DTMF translation module 415, and a payment application 417. In one embodiment, the transaction processor 420 may receive sensitive data from the telephony cloud platform 405 (e.g., via the DTMF translation module 415). Exemplary sensitive data may include a personal account number (PAN), a card verification value (CVV), and/or an expiration date of a credit card, for example, in order to execute an online purchase. The transaction processor 420 may include a data security service 425 and a payment processor 430. In one embodiment, the data security service 425 may tokenize and/or encrypt the PAN received from the telephony cloud platform 405. In one embodiment, the data security service 425 may provide a token (e.g., a low-value token) to the telephony cloud platform 405. As previously discussed, the low-value token may be a randomly generated, non-sensitive, registration identifier that acts as a replacement for the PAN and/or other sensitive data. The low-value token may be generated dynamically or utilize additional compensating controls, like the low-value tokens described previously for FIG. 3.

In one embodiment, the payment processor 425 may obtain a token associated with sensitive data received from the telephony cloud platform 405. In one embodiment, the payment processor 430 may retrieve a high-value token (e.g., upon receipt of a low-value token and/or authorization request from the payment application 417). This token may be provided to the telephony cloud platform 405, e.g., the payment application 417. In one embodiment, the high-value token may be generated by the data security service 425, using the low-value token provided previously by the data security service 425.

In one embodiment, the payment application module 417 may provide an authorization response to merchant 435, along with a high-value token. For example, the payment application 417 may provide an authorization response to the merchant system 435. In one embodiment, the telephony cloud platform 405 or merchant system 435 may store and/or reuse the high-value token for subsequent transactions.

In one embodiment, the merchant system 335 may receive authentication and interact with payment processor 417 of the telephony cloud platform 405, but the merchant system 435 cannot interact directly with data security service 425. Analogously to system 300 of FIG. 3, the merchant system 435 may use tokens to complete transactions, rather than actual cardholder data, which may be accessible only to the non-payment components of the telephony cloud platform 405 (e.g., DTMF translation module) and the non-payment components of the transaction processor 420 (e.g., data security service 425).

Figure 5:
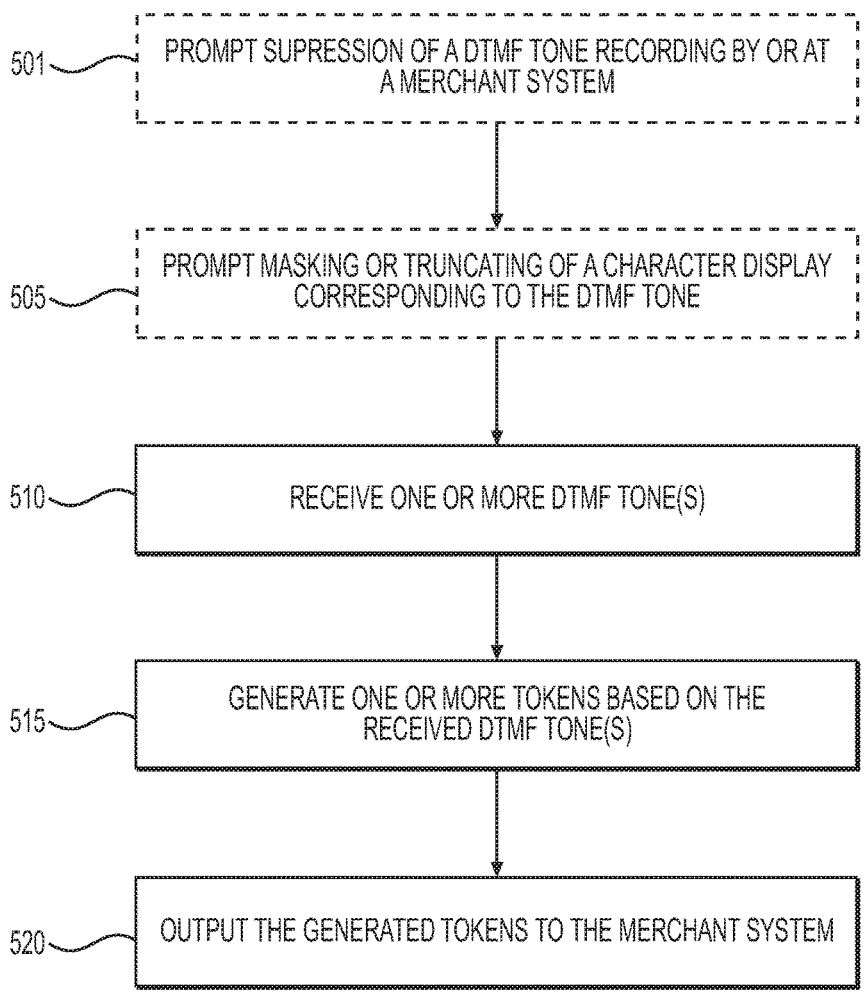
FIG. 5 is a flow diagram illustrating a method of performing an IVR transaction while tokenizing DTMF input, according to techniques presented herein.

FIG. 5 is a flow diagram illustrating a method of performing an IVR transaction while tokenizing DTMF input, according to techniques presented herein. In one embodiment, step 501 may include determining transmission of secure/cardholder data. Step 501 may include prompting suppression of a DTMF tone recording by or at a merchant system. In one embodiment, step 505 may including prompting a masking (or truncating) of a character display corresponding to the DTMF tone. As previously described, the display may be a display used by a call center agent. The agent may remain in contact with the user/customer with no redirects. Further, the agent may hear the customer speaking, but may not hear DTMF tones. Rather the agent may view cardholder data being entered (via DTMF) by watching his/her display. The display may be generated by a stand-alone app, or integrated with a payment page, e.g., via an embedded iFrame. In one embodiment, the display and/or masking/truncating of the DTMF tone information may be managed by an entity other than the merchant. For example, any of the previously-described components, e.g., the user device, telephony platform, transaction processor, or tone-to-token platform may control the display viewable to the agent.

In one embodiment, step 520 may include receiving one or more DTMF tones. The DTMF tones may be entered by a user and received by a cloud platform, cloud platform API, and/or independent processor. Step 515 may include generating one or more tokens based on the received DTMF tone(s). Step 510 may include outputting the generated token(s) to the merchant system. The generated token(s) may be used to complete or process an order. For example, an agent may see the completion of cardholder data entry via his/her display, and submit an order. In one scenario, the agent may see a portion of the entered data and use the viewable portion to confirm or verify information with the customer. Such viewable portions may help the merchant maintain existing operations while introducing tokens into their environment.

In one embodiment, authorization may be performed after the DTMF tone(s) are tokenized. Either the merchant or the cloud platform may perform the authorization. In a trusted environment, high-value tokens may be returned with an authorization response, for instance, in response to receiving a low-value token.

Using systems and methods such as those presently described, sensitive data (e.g., cardholder data) might not be transmitted to the merchant's servers because DTMF tones may be intercepted and tokenized prior to reaching a merchant. In one embodiment, the tone-to-token platform may be comprised of an API of a telephony cloud platform. The systems and methods further introduce a solution to security concerns, without interfering or slowing down business operations. The presently described systems and methods permit call center agents to interact with cardholder data via, for example, a token generated from the cardholder data and/or a display of truncated/masked cardholder data. In particular, DTMF tone suppression described in the present disclosure may permit an agent to hear continually interact and speak to a user/customer, without allowing the agent to hear or record DTMF tones. In this way, the present disclosure may provide call center customers with increased cardholder data security, while not negatively impacting or delaying cycle time.

Techniques presented herein improve the technical field by, for example, enabling a merchant to comply with the Payment Card Industry Data Security Standard (PCI DSS) in a manner that builds value, preserves risk reduction, enables a cost-effective architecture, and that does not dilute the original value proposition. This allows merchants to process IVR transactions without directly handling cardholder data. The field of tokenization and network security is improved, thus limiting the potential of a security breach. Further, techniques presented herein solve a problem arising in the post-Internet era, namely, for example, providing a telephony cloud platform solution to security gaps in call center merchant environments. For example, merchants that process card not present (CNP) transactions and mail order/telephone order (MOTO) transactions may face PCI DCC compliance challenges. The techniques presented herein facilitate PCI DSS compliance by offering an IVR/cloud-hosted solution provider that captures cardholder data.

Embodiments of the present disclosure may relate to computer storage products with a computer-readable medium that have computer code thereon for performing various computer-implemented operations. The media and computer code may be those specially designed and constructed for the purposes of the present disclosure, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While the present disclosure has been described in terms of several embodiments, there are alterations, modifications, permutations, and substitute equivalents, that fall within the scope of this disclosure.

It should also be noted that there are many alternative ways of implementing the methods and systems of the present disclosure. It is therefore intended that the following appended claims be interpreted as including all such alterations, modifications, permutations, and substitute equivalents as fall within the true spirit and scope of the present disclosure.

What is claimed is:

1. A method for enabling the generation of a token corresponding to a tone generated by a telephony system, the method comprising:
   detecting, by a processor separate from a merchant system, a dual tone multi-frequency (DTMF) tone generated by a telephony system;
   intercepting, by the processor, the detected DTMF tone;
   tokenizing, by the processor, the intercepted DTMF tone to create a low-value token;
   generating, by the processor, a high-value token based on the low-value token, wherein the low-value token applies to one specific transaction and the high-value token applies to multiple transactions; and
   transmitting, by the processor, the high-value token to to the merchant system to complete a transaction.

2. The method of claim 1, wherein the intercepted DTMF tone corresponds to cardholder data.

3. The method of claim 1, further comprising:
   prompting processing of a payment or transaction using the high-value token.

4. The method of claim 1, further comprising:
   prompting suppression of DTMF tone recording by the merchant system.

5. The method of claim 1, further comprising:
   generating or prompting a display corresponding to the intercepted DTMF tone.

6. The method of claim 1, wherein the display includes a masked or truncated view of one or more characters, each of the one or more characters corresponding to the the intercepted DTMF tone.

7. The method of claim 1, wherein the low-value token is generated in response to detection of cardholder data.

8. A system for enabling the generation of a token corresponding to a tone generated by a telephony system, the system comprising:
   a data storage device storing instructions for enabling the generation of a token corresponding to a tone generated by a telephony system; and
   a processor configured to execute the instructions to perform a method comprising:
   detecting, by a processor separate from a merchant system, a dual tone multi-frequency (DTMF) tone generated by a telephony system;
   intercepting, by the processor, the detected DTMF tone;
   tokenizing, by the processor, the intercepted DTMF tone to create a low-value token;
   generating, by the processor, a high-value token based on the low-value token, wherein the low-value token applies to one specific transaction and the high-value token applies to multiple transactions; and
   transmitting, by the processor, the high-value token to to the merchant system to complete a transaction.

9. The system of claim 8, wherein the intercepted DTMF tone corresponds to cardholder data.

10. The system of claim 8, further comprising:
    prompting processing of a payment or transaction using the high-value token.

11. The system of claim 8, further comprising:
    prompting suppression of DTMF tone recording by the merchant system.

12. The system of claim 8, further comprising:
    generating or prompting a display corresponding to the intercepted DTMF tone.

13. The system of claim 8, wherein the display includes a masked or truncated view of one or more characters, each of the one or more characters corresponding to the intercepted DTMF tone.

14. The system of claim 8, wherein the low-value token is generated in response to detection of cardholder data.

15. A non-transitory computer-readable medium storing instructions that, when executed by a transaction processor, cause the transaction processor to perform a method for enabling the generation of a token corresponding to a tone generated by a telephony system, the method comprising:
    detecting, by a processor separate from a merchant system, a dual tone multi-frequency (DTMF) tone generated by a telephony system;
    intercepting, by the processor, the detected DTMF tone;
    tokenizing, by the processor, the intercepted DTMF tone to create a low-value token;
    generating, by the processor, a high-value token based on the low-value token, wherein the low-value token applies to one specific transaction and the high-value token applies to multiple transactions; and
    transmitting, by the processor, the high-value token to to the merchant system to complete a transaction.

16. The computer-readable medium of claim 15, wherein the intercepted DTMF tone corresponds to cardholder data.

17. The computer-readable medium of claim 15, further comprising:
    prompting processing of a payment or transaction using the high-value token.

18. The computer-readable medium of claim 15, further comprising:
    prompting suppression of DTMF tone recording by the merchant system.

19. The computer-readable medium of claim 15, further comprising:
    generating or prompting a display corresponding to the intercepted DTMF tone.

20. The computer-readable medium of claim 15, wherein the display includes a masked or truncated view of one or more characters, each of the one or more characters corresponding to the intercepted DTMF tone.

* * * * *

UNITED STATES PATENT AND TRADEMARK OFFICE
CERTIFICATE OF CORRECTION

PATENT NO. : 10,176,472 B1
APPLICATION NO. : 15/380498
DATED : January 8, 2019
INVENTOR(S) : Brant Peterson Page 1 of 1

It is certified that error appears in the above-identified patent and that said Letters Patent is hereby corrected as shown below:

In the Claims

Column 11, Line 40, In Claim 1, delete "to to" and insert --to--.

Column 11, Line 55, In Claim 6, delete "the the" and insert --the--.

Column 12, Line 11, In Claim 8, delete "to to" and insert --to--.

Column 12, Line 46, In Claim 15, delete "to to" and insert --to--.

Signed and Sealed this
Fourth Day of June, 2019

Andrei Iancu
*Director of the United States Patent and Trademark Office*